UNITED STATES PATENT OFFICE.

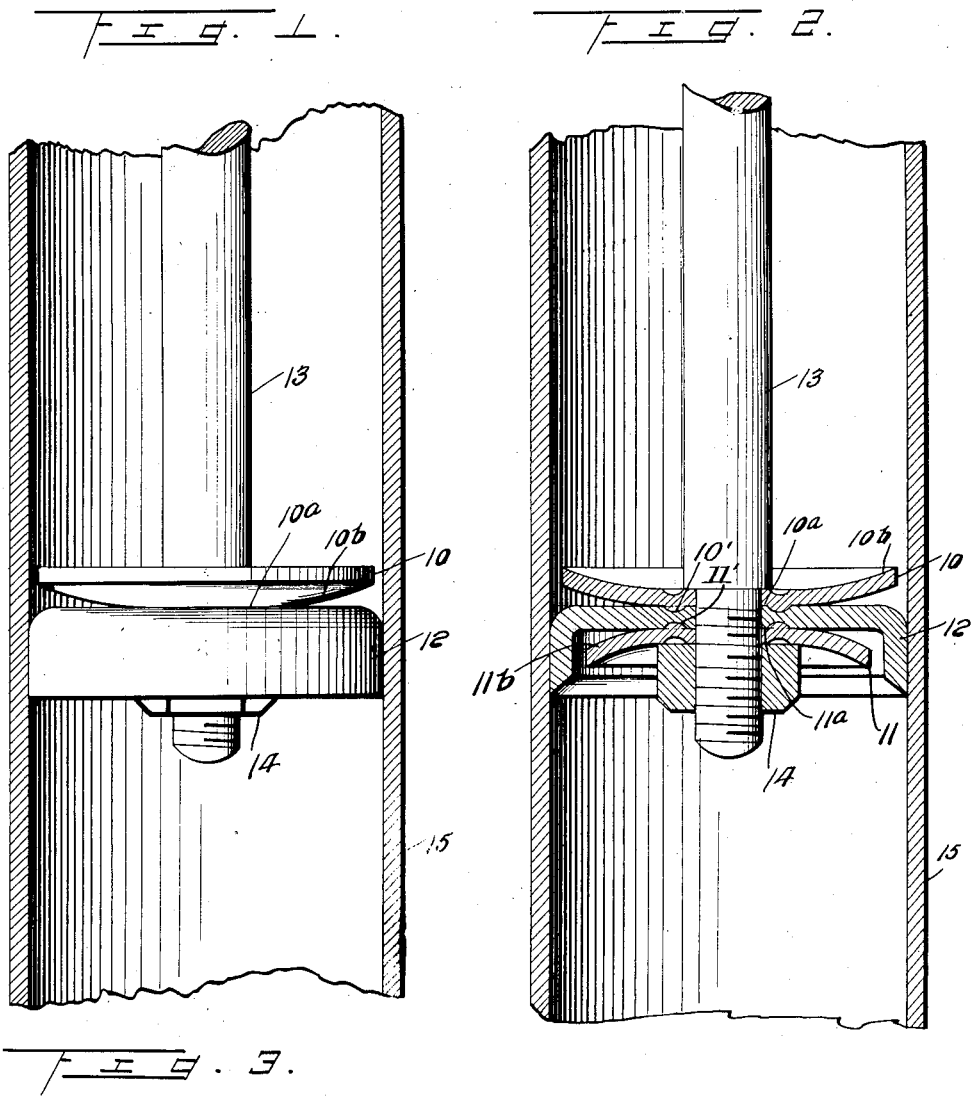

HANS L. C. HANSEN, OF CHICAGO, ILLINOIS.

PUMP-PISTON.

1,388,254.  Specification of Letters Patent.  Patented Aug. 23, 1921.

Application filed December 7, 1920. Serial No. 428,915.

*To all whom it may concern:*

Be it known that I, HANS L. C. HANSEN, a subject of the King of Denmark, residing at Chicago, in the county of Cook and State of Illinois, have invented certain new and useful Improvements in Pump-Pistons, and I do hereby declare the following to be a full, clear, and exact description of the invention, such as will enable others skilled in the art to which it appertains to make and use the same.

The object of the invention is to provide a simple, inexpensive and efficient piston for pumps and like devices and more particularly those of the hand operated type, and more especially to provide improved means for holding the piston cup in position and preventing leakage around the cup or the piston rod to secure the greatest efficiency in the operation of the pump; and with this object in view the invention consists in a construction and combination of which a preferred embodiment is shown in the drawing; wherein—

Figure 1 is a side view of a pump piston arranged in a cylinder and having cup retaining means constructed and arranged in accordance with the invention.

Fig. 2 is a sectional view of the same.

Fig. 3 is a plan view, and

Fig. 4 is a sectional view of one of the washers.

The invention resides essentially in the washers 10 and 11 which are disposed in relatively reversed positions upon opposite sides of the plane of a piston cup 12 of the ordinary construction upon a piston rod 13, said parts being held in place by the usual nut 14 for use in a cylinder 15.

In order that the cup may expand and contract with the maximum efficiency it is preferred to employ an upper or backing washer 10, which supports the cup 12 during the power or compression stroke and which backing washer 10 is of larger diameter than the washer 11 which supports the cup during the return or suction stroke and to provide said washers 10 and 11 with central annular bearing surfaces 10$^a$ and 11$^a$ respectively for contacting with the web of the cup and arranged in parallel relation, said bearing surfaces being flat or corrugated and in planes perpendicular to the path of movement of the piston or plunger. The outer or peripheral portions of the washers on the other hand are deflected from the plane of the bearing portions 10$^a$ and 11$^a$ to form the preferably convexed arcuate checking surfaces 10$^b$ and 11$^b$ which, as to the two washers, recede from each other toward their peripheries to permit of an amplitude of movement of the rim of the cup which gradually increases from its center outward. The result of this operation under the power or driving stroke is to throw the flange of the cup promptly into expansive relation with the inner surface of the cylinder and on the reverse or suction stroke to permit said flange to swing inward so as to relieve the pressure upon and frictional contact with the surface of the cylinder or barrel, to minimize the friction and hence the wear upon the cup and proportionately increase the durability and efficiency thereof. Obviously on an exhaust pump the parts would be reversed but the relation as to the power stroke and the return stroke will be identical with that above indicated.

By referring to Figs. 2, 3 and 4 of the drawings, it will be seen that the washers 10 and 11 are provided with concentric ribs 10' and 11' respectively on their convex faces. These ribs are shown as being produced by pressing or offsetting a portion of the washers 10 and 11, around the flat central portions 10$^a$ and 11$^a$ of the washers 10 and 11, respectively. It will be seen that when the washers 10 and 11 are placed upon opposite sides of the main or central flat portion of the piston cup or cup member 12, the ribs 10' and 11' will contact with said piston cup or cup member 12 and as the washers 10 and 11 are tightened against the opposite sides of said cup member 12, these ribs 10' and 11' will be forced into the opposite sides of said cup member 12, at a point adjacent the piston rod 13, thereby separating the fibers of the cup member 12 and forcing a spreading thereof inwardly toward the piston rod 13 to tighten the cup member 12 upon said piston rod 13 and prevent the fluid from leaking through the central opening of the cup member 12, around the piston rod 13. The fibers which are forced to spread outwardly will be brought into close contact with the outer edge portions of the ribs 10' and 11' and the adjacent portions of the washers 10 and 11 thereby preventing the fluid from passing between the washers 10 and 11 and the cup member 12 in a direction toward the piston rod 13. It will therefore be evident that a close and fluid tight mounting of the cup member 12 and the opposed washers 10 and 11 on the piston rod 13 is provided.

Having thus described the invention, what I claim is:—

1. A pump piston comprising a piston rod, a cup member mounted on said rod, a backing washer engaged with one face of the main portion of said cup member and of a diameter slightly less than the diameter of said cup member, said backing washer having a convex face opposed to the cup member, and a second washer of decreased diameter engaged with the opposite face of said main portion of the cup member, said second mentioned washer having a convex face opposed to the opposite main portion of said cup member.

2. A pump piston comprising the combination with a cylinder and a piston rod within said cylinder, of a cup member having its flanged outer portion contacting with the inner face of said cylinder, said cup member being mounted on said piston rod, oppositely acting movement limiting washers mounted on said piston rod on opposite sides of the main portion of said cup member and having convex faces opposed to said cup member, said washers having flat central portions contacting with said cup member, and means for securing said cup member and said washers in position on said piston rod.

3. A pump piston comprising the combination with a cylinder and a piston rod within said cylinder, of a piston cup mounted on said piston rod, and having its annular flanged portion of increased thickness contacting with the inner wall of said cylinder, a backing washer of concavo-convex form mounted on said piston rod and having its convex face opposed to the outer face of the main portion of said piston cup, said backing washer having a flat central portion bearing against the central portion of said piston cup, said backing washer limiting movement of the piston cup in one direction during one stroke of the piston, a second movement limiting washer of decreased diameter and of concavo-convex form, said second movement limiting washer having its convex face opposed to the inner face of the main portion of said piston cup, said second movement limiting washer having a flat central portion bearing against the central portion of said piston cup, said second movement limiting washer serving to limit movement of the piston cup in the reverse direction during the reverse stroke of the piston, and means for retaining said piston cup and said washers in position upon said piston rod.

4. A pump piston comprising a piston rod, a cup leather mounted on said rod, and a backing washer mounted on said rod on each side of said cup leather and having convex faces opposing the same, said washers having ribs engaging said cup leather and clenching it upon said rod to provide a liquid tight connection between said cup leather and said piston rod.

In testimony whereof I affix my signature in presence of two witnesses.

HANS L. C. HANSEN.

Witnesses:
HAROLD A. CLARK,
NORTON H. BYAM.